United States Patent [19]

Renoux et al.

[11] 3,885,011

[45] May 20, 1975

[54] VACCINE ADJUVANTS

[75] Inventors: Gerard Renoux; Micheline Renoux, both of Indre et Loire, France

[73] Assignee: Janssen Pharmaceutica N.V., Beerse, Belgium

[22] Filed: Mar. 16, 1973

[21] Appl. No.: 342,118

Related U.S. Application Data

[62] Division of Ser. No. 213,554, Dec. 29, 1971, abandoned.

[52] U.S. Cl.................................. 424/92; 424/270
[51] Int. Cl............................................... C12k 5/00
[58] Field of Search......................... 424/89, 270, 92

[56] References Cited
OTHER PUBLICATIONS
Chemical Abstracts, Vol. 74, entry 85756b, 1971.

Primary Examiner—Richard L. Huff
Attorney, Agent, or Firm—Salvatore R. Conte

[57] ABSTRACT

The immunostimulating action of certain imidazo[2,1-b]thiazoles when used as a vaccine adjuvant.

9 Claims, 2 Drawing Figures

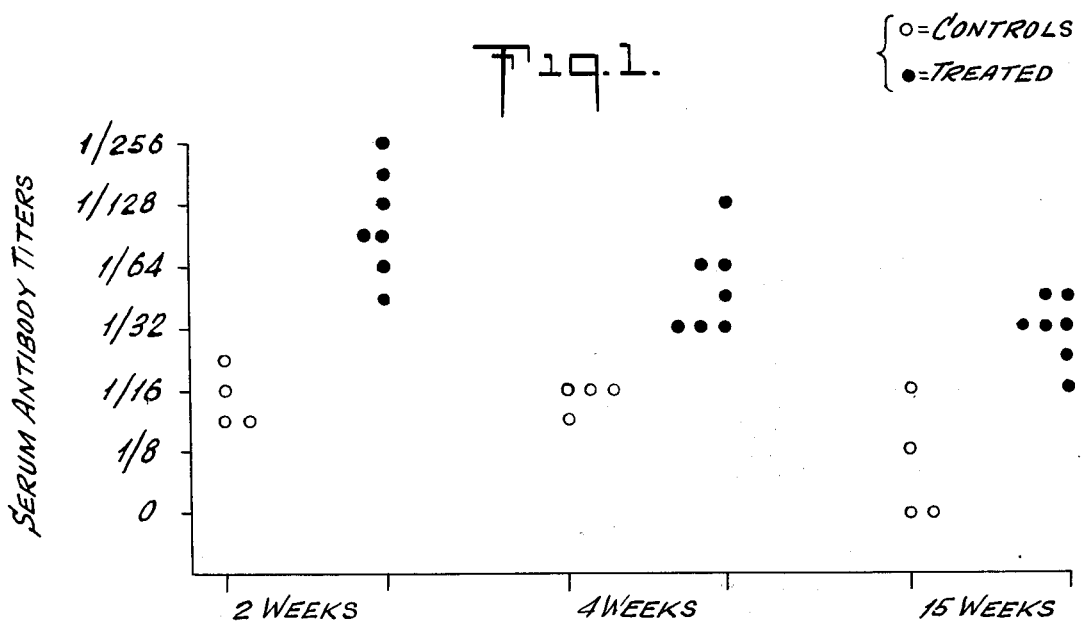
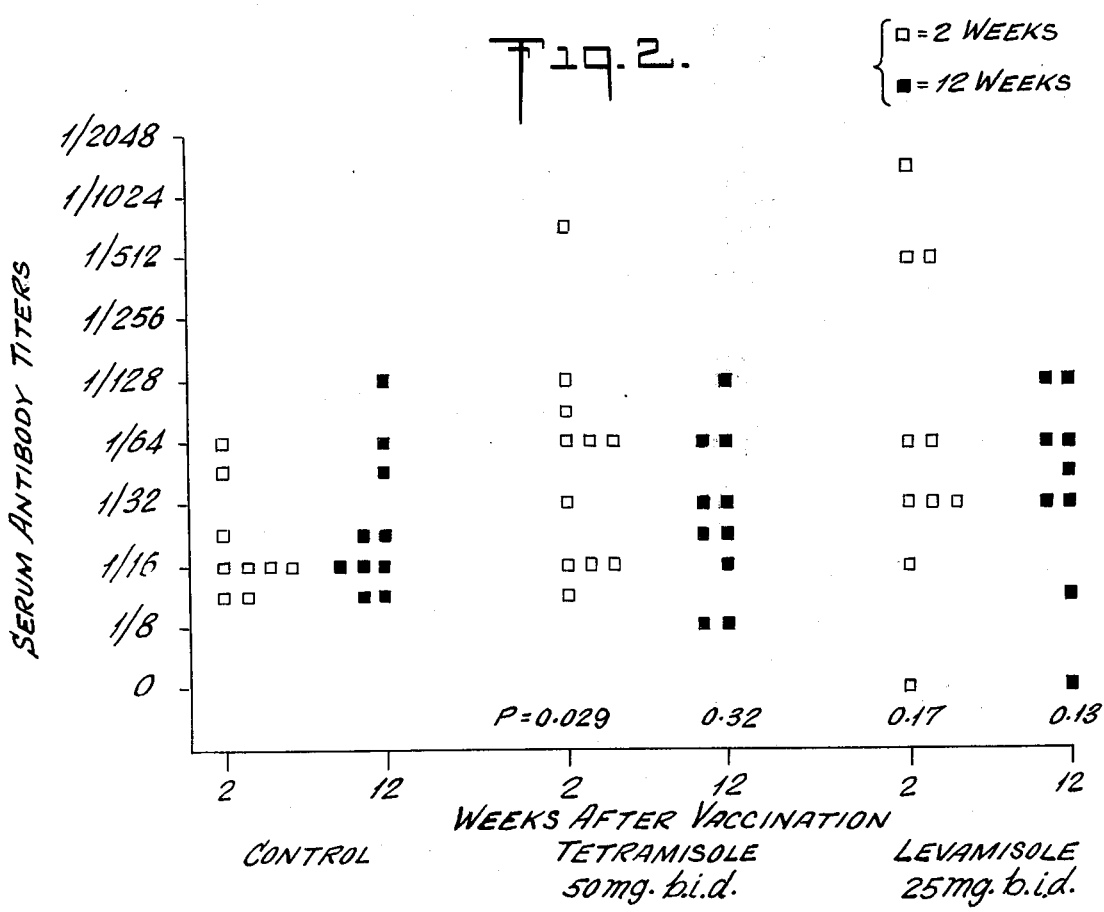

VACCINE ADJUVANTS

CROSS-REFERENCE TO RELATED APPLICATION:

This application is a division of our copending application Ser. No. 213,554, filed Dec. 29, 1971, now abandoned.

DESCRIPTION OF THE INVENTION:

This invention is concerned with the administration of imidazo[2,1-b]thiazoles as an adjuvant with injectable immunological substances (i.e., vaccines) in order to increase the immunogenic potential of the latter.

Vaccines are preparations of antigenic material for administration to induce in the recipient an immunity to infection or intoxication by a given infecting agent. Vaccines may be prepared from viruses, rickettsiae, bacteria, protozoa and metazoa. Inactivated vaccines may be sterile suspensions of the killed organism or of toxoids or other antigenic material derived from the organisms, and are generally administered by injection. Vaccines may be either simple vaccines prepared from one species or variety or organism, or they may be mixed vaccines containing two or more simple vaccines. They are prepared in such a manner as not to destroy the antigenic material, although the methods of preparation vary, depending on the vaccine. The final products are distributed under aseptic conditions into sterile containers, which are then sealed so as to exclude contaminating microorganisms. A pharmaceutically acceptable bacteriostat may be added to sterile and inactivated vaccines, particularly if such vaccines are issued in containers sealed so as to permit the withdrawal of successive doses on different occasions.

Vaccine adjuvants are used to enhance the ability of the antigenic material in a vaccine to induce the desired immune response, and with many poorly antigenic materials the success of vaccination depends on the use of a suitable adjuvant with the vaccine. The adjuvant may be conveniently incorporated in the vaccine before the latter is distributed into containers, although it may be provided in a separate container for mixing with the antigenic material when the vaccine is required for use in immunizing the recipient, or, as shown hereinafter, it may be administered separately, e.g., at a different site or by a different route, either at the same time or within a suitable period either prior to or subsequent to the vaccine itself.

Considerable work has been reported in the literature with regard to vaccine adjuvants. Illustrative is the addition of tapioca or calcium chloride to intensify antitoxin immunization; the use of calcium phosphate particularly to potentiate influenze antibody production; the use of staphylotoxin to improve the antibody response to certain antigens; the use of alum in diphtheria toxoid or bacterial vaccines such as *H. pertussis;* and others. The adjuvant serves to either effect an increase in the antibody titer and/or to augment host protection without an increased antibody titer over that which would ordinarily be attained without the use of the adjuvant.

It has now been found that certain imidazo[2,1-b]-thiazoles possess surprisingly remarkable immunostimulating properties when used as vaccine adjuvants. Said imidazo[2,1-b]thiazoles are described by the general formula:

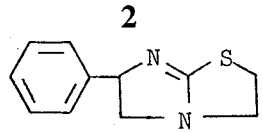

For the purposes of this invention, said compounds may be utilized in their racemate form or in the form of their resolved enantiomorphs, whether as an acid addition salt or the base form. The foregoing imidazo[2,1-b]thiazoles, which are noted for their anthelmintic activity, have been previously described in U.S. Pat. No. 3,274,209.

Among the preferred species utilizable herein are dl-2,3,5,6-tetrahydro-6-phenyl-imidazo[2,1-b]thiazole and its resolved levo isomer, including the therapeutically active acid addition salts thereof, preferably the hydrochloride. The hydrochloride salts of said species are well known commercial anthelmintics, the racemate salt being generically denoted as "tetramisole" and the levo isomer salt as "levamisole."

The mode of immunostimulating action occurring upon administration of the subject adjuvants with vaccines is not clearly established. In certain instances, an increased production of antibodies is observed and, in other instances, an augmentation of host protection without an increased antibody titer is observed. Without being bound, therefore, to a particular theory as to the mode of action, the subject adjuvants can be successfully administered with immunological substances, preferably those which are known to be relatively weakly immunogenic, in order to potentiate the desired protection of the host, for example, in the field of vaccination against infectious disease agents, against various toxins, and the like.

The relative amounts needed of the subject adjuvants in relation to a particular vaccine depend on the immunological characteristics of the vaccine antigen, and the total amounts of each needed per dose may also depend to some extent on the species and size of the recipient and the nature of the infection or intoxication to be immunized against. In small animals such as mice and guinea pigs, the amount of adjuvant is preferably between 0.01 and 2.0 mg/kg body weight. In any case the dose to be used is one nontoxic to the recipient. In view of the reported anthelmintic activity of the subject adjuvants, a dose of from about 0.01 mg/kg body weight up to the nontoxic anthelmintic dose for the particular host can be generally utilized. For example, the recommended nontoxic anthelmintic oral dose for tetramisole is about 5 mg/kg in man, about 15 mg/kg in sheep, about 10 mg/kg in cattle, and about 40 mg/kg in chicken; and for levamisole about 2.5 mg/kg in man, about 8 mg/kg in sheep, and about 8 mg/kg in cattle.

In the method of producing immunization by the administration of a vaccine, therefore, this invention offers the improvement comprising the adjunctive administration of an effective immunostimulating amount of the subject imidazo[2,1-b]thiazoles. By "adjunctive administration" is meant the administration of the subject adjuvants to a host substantially at the same time with, whether formulated into the particular vaccine as a combined product or administered separately, or within an appropriate time prior to or subsequent to the administration of the vaccine itself. As a general rule, the subject adjuvants are administered within the two day period immediately preceding and the two week period immediately following administration of the vaccine, preferably substantially simultaneous with and during the two week period subsequent to vaccination.

An effective immunostimulating amount of the vaccine adjuvants described herein may be readily mixed accordingly to conventional procedures in the art with the antigenic material of a particular vaccine to form a combined product, or an immunizing kit may be provided comprising preparations of the antigenic material and an effective immunostimulating amount of the subject adjuvant, which may be in separate containers for separate administration or for subsequent mixing prior to administration as a combined product. For purposes of solubility in aqueous preparations, the acid addition salt form of the subject adjuvants is preferred. In a combined product, the amount of adjuvant is preferably that amount sufficient to provide from about 0.01 mg/kg based on the host weight, up to the nontoxic anthelmintic dose for said host weight, per unit dose of vaccine.

The adjuvant effect of the imidazo[2,1-b]-thiazoles of formula (I) is illustrated by the following examples:

EXAMPLE I

Each of a group of female mice, CD 1 (Ch. Rivers) and weighing 21 ± 2 grams, is injected subcutaneously with a live anti-brucellosis vaccine, B19 : 1 × 10$^9$ bacteria per mouse. Each of another similar group is injected subcutaneously with a killed anti-brucellosis vaccine, H38 in incomplete adjuvant (see G. Renoux, Ann. Inst. Pasteur, 103, 1962, p. 786): 15 × 10$^9$ cells per mouse. 25 Micrograms of dl-2,3,5,6-tetrahydro-6-phenyl-imidazo[2,1-b]thiazole hydrochloride (PIT) is also injected subcutaneously either 2 days before, simultaneously, or 2 days after said vaccinations. An interval of 42 days is allowed to lapse between the vaccination and the challenge infection. The challenge constitutes a subcutaneous injection of 2 × 10$^4$ living cells of Brucella abortus, strain 554, i.e., approximately 10 doses of 50% infectious activity. The mice are killed 11 days after the challenge infection. The spleens, removed aseptically, are arranged in 2 groups of 5 for each lot of 10, one group designated "A" and the other "B". Each group of 5 is weighed, ground up, and diluted to 1/10, 1/100 and 1/1000 (weight/volume) in sterile saline solution. With calibrated micropipettes, ten drops of each dilution are seeded, being kept well separated from one another. They are incubated at 37°C in an atmosphere containing 10% $CO_2$. Between the third and fifth day of incubation, the total Brucella colonies of group "A" and of group "B" are counted under a binocular scope. The following table summarizes the results obtained.

TABLE I

Effect of 6-Phenyl-Imidazo[2,1-b]thiazole (PIT) on the Anti-Brucellosis Immunization of Mice

| Treatment | | Mean weight of a spleen (mg) | Colonies of B. abortus per gram of spleen (± standard deviation |
|---|---|---|---|
| H 38-vaccine only | A | 164 | 0 |
| | B | 427 | 0 |
| PIT 2 days before H 38-vaccine | A | 432 | 0 |
| | B | 651 | 0 |
| PIT simultaneously with H 38-vaccine | A | 627 | 0 |
| | B | 268 | 0 |
| PIT 2 days after H 38-vaccine | A | 604 | 0 |
| | B | 459 | 0 |

TABLE I-Continued

Effect of 6-Phenyl-Imidazo[2,1-b]thiazole (PIT) on the Anti-Brucellosis Immunization of Mice

| Treatment | | Mean weight of a spleen (mg) | Colonies of B. abortus per gram of spleen (± standard deviation |
|---|---|---|---|
| B 19-vaccine only | A | 181 | 200 ± 32 |
| | B | 140 | 1700 ± 77 |
| PIT 2 days before B 19-vaccine | A | 187 | 0 |
| | B | 235 | 332 ± 48 |
| PIT simultaneously with B 19-vaccine | A | 268 | 0 |
| | B | 145 | 830 ± 211 |
| PIT 2 days after B 19-vaccine | A | 185 | 0 |
| | B | 220 | 0 |
| Controls for B. abortus-infection | A | 125 | 87980 ± 7936 |
| | B | 185 | 67920 ± 7252 |

The adjuvant activity of PIT is not shown with the killed vaccine, H38 in incomplete adjuvant, due to the fact that, under the experimental conditions, this vaccine itself completely immunizees the mice. However, the immunostimulating activity of PIT is demonstrably shown with the living vaccine, B19, which does not completely immunize the mice by itself. Although there is a marked decrease in the number of Brucella when PIT is administered two days prior to or simultaneously with the B19 vaccination, the mice are completely immunized when PIT is administered two days after the B19 vaccination, such total immunization not being observed heretofore with B19 vaccine.

The immunostimulating effect of tetramisole, according to the foregoing test procedure, is also observed for the simultaneous administration of adjuvant and vaccine with a combination product consisting of 25 micrograms of tetramisole mixed with the B-19 vaccine.

EXAMPLE II

Each of a group of 30 male adults, ranging in age from 33 to 67 years old (median age: 53), were injected subcutaneously with 360 I.U. of $A_2$/Aichi/2/1968 influenza virus vaccine in the upper arm. Half were treated orally for two weeks from the day of vaccination with 50 mg. of tetramisole twice a day (b.i.d.) and the other half served as controls. In those subjects found to be serum negative for antibody titers before vaccination (eleven in number), the serum antibody titers, as determined by the conventional (see Hirst, J. K., J. Exp. Med. 15, 49, 1962) hemagglutination inhibition test (HI test), were markedly higher 2 and 4 weeks after, and remained higher 15 weeks after, vaccination in the tetramisole-treated subjects than in the controls. The results from the 11 such subjects, 4 controls versus 7 treated with tetramisole, are illustrated in FIG. 1. In those subjects found to be serum positive before vaccination (nineteen in number), the antibody titers were not significantly different in the tetramisole-treated subjects and in the controls.

EXAMPLE III

Thirty-one subjects (19 males and 12 females, ranging from 20 to 57 years old) were divided into three groups, approximately balanced as to sex and age. Each of the subjects had been previously found to be serum negative for antibody titers according to the HI test against the $A_2$/Aichi/2/1968 influenza virus strain. One group served as the controls, the other two groups being treated orally with either 25 mg. b.i.d. of levamisole or 50 mg b.i.d. of tetramisole, respectively, for two weeks from the day of vaccination (360 I.U. of A₂/Aichi/2/1968 influenza virus vaccine). Two weeks after vaccination, the serum antibody titers, as determined by the HI test, were significantly higher according to the Mann-Whitney U test in the levamisole (p-0.017) and tetramisole (p-0.029) treated subjects than in the controls. By the third month after vaccination, the titers for both were not significantly (p>0.1) different from those of the controls. These results are illustrated in FIG. 2.

EXAMPLE IV

The technique of Example I is followed using the killed antibrucellosis vaccine H-38 alone in a comparative study of 10, 25, 250 and 2,500 doses of 50% infectious activity (ID = infectious doses) in accordance with the administrataion schedule shown in Table 2.

TABLE II

| Treatment | B. abortus colonies per gram of spleen following challenge with | | | |
|---|---|---|---|---|
| | 2500 ID 50% | 250 ID 50% | 25 ID 50% | 10 ID 50% |
| A. Simultaneously | 19355 ± 2010 | 133 ± 15 | 0 | ND |
| B. T 48 hrs. before and 2nd dose simultaneously | 3034 ± 289 | 2075 ± 322 | 0 | ND |
| C. T simultaneously and 2nd dose 48 hrs after | 1556 ± 133 | 41 ± 5 | 0 | ND |
| D. T 48 hours before, 2nd dose simultaneously and 3rd dose 48 hrs. after | 11354 ± 1721 | 598 ± 43 | 532 ± 44 | ND |
| E. H-38 vaccine alone | 38548 ± 4350 | 183 ± 15 | 5 | ND |
| F. Untreated | ND | ND | ND | 628150 ± 47000 |

T = tetramisole (dose = 25 μg)
ND = not done

The results indicate that the adjunctive administration of tetramisole 48 hours before, together with and 48 hours after vaccination produced an increased protection of the host as demonstrated by the marked reduction in the bacterial count of the treated animals as compared to the vaccinated but untreated animals. The results also indicate that the preferred time of administration of tetramisole is at the same time of vaccination followed by a second tetramisole treatment 48 hours after vaccination.

We claim:

1. In the method of producing an immunological response in a host by the administration of a vaccine, the improvement which comprises the adjunctive administration to said host of an effective immunostimulating amount of a member selected from the group consisting of an imidazo[2,1-b]-thiazole having the formula:

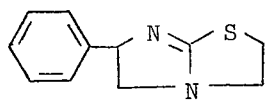

and the therapeutically active acid addition salts thereof.

2. In the method of producing an immunological response in a host by the administration of a vaccine, the improvement which comprises the adjunctive administration to said host of an effective immunostimulating amount of a member selected from the group consisting of dl-2,3,5,6-tetrahydro-6-phenyl-imidazo[2,1-b]thiazole and the therapeutically active acid addition salts thereof.

3. In the method of claim 2, said acid addition salt being the hydrochloride.

4. In the method of claim 2, said vaccine being antibrucellosis vaccine.

5. In the method of producing an immunological response in a host by the administration of a vaccine, the improvement which comprises the adjunctive administration to said host of an effective immunostimulating amount of a member selected from the group consisting of levo-2,3,5,6-tetrahydro-6-phenyl-imidazo[2,1-b]thiazole and the therapeutically active acid addition salts thereof.

6. In the method of claim 5, said acid addition salt being the hydrochloride.

7. In a vaccine comprising antigenic material, the improvement characterized in that an effective immunostimulating amount of an adjuvant is included in the vaccine, said adjuvant being a member selected from the group consisting of:

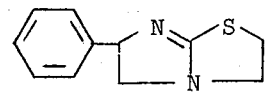

and the therapeutically active acid addition salts thereof.

8. In a vaccine comprising antigenic material, the improvement characterized in that an effective immunostimulating amount of an adjuvant is included in the vaccine, said adjuvant being a member selected from the group consisting of dl-2,3,5,6-tetrahydro-6-phenyl-imidazo[2,1-b]thiazole and the therapeutically active acid addition salts thereof.

9. In a vaccine comprising antigenic material, the improvement characterized in that an effective immunostimulating amount of an adjuvant is included in the vaccine, said adjuvant being a member selected from the group consisting of levo-2,3,5,6-tetrahydro-6-phenyl-imidazo[2,1-b]thiazole and the therapeutically active acid addition salts thereof.

* * * * *